Figure 1:
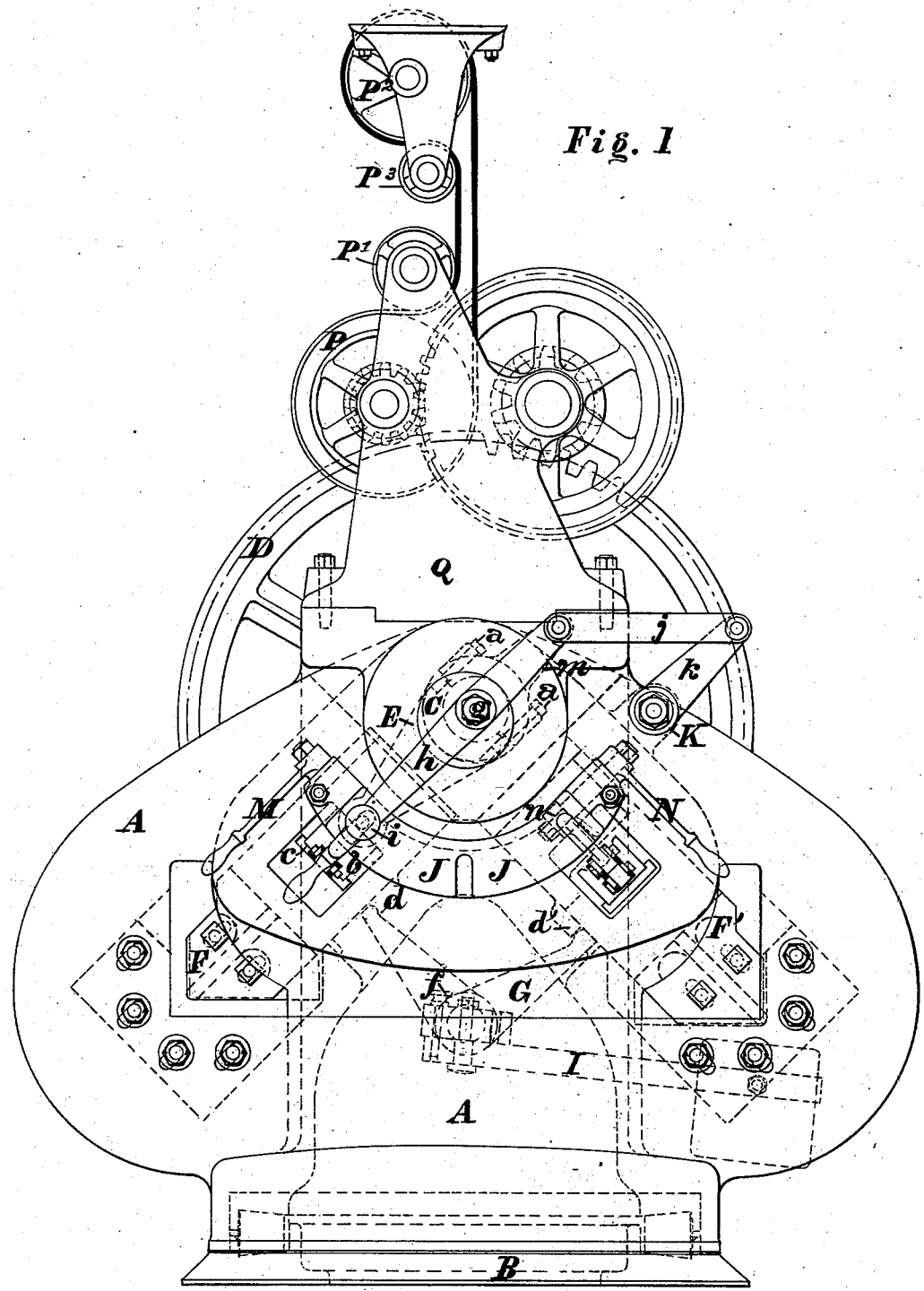

(Model.)

W. & C. SELLERS.
Angle Shears.

No. 235,908. Patented Dec. 28, 1880.

Witnesses:

Inventors:

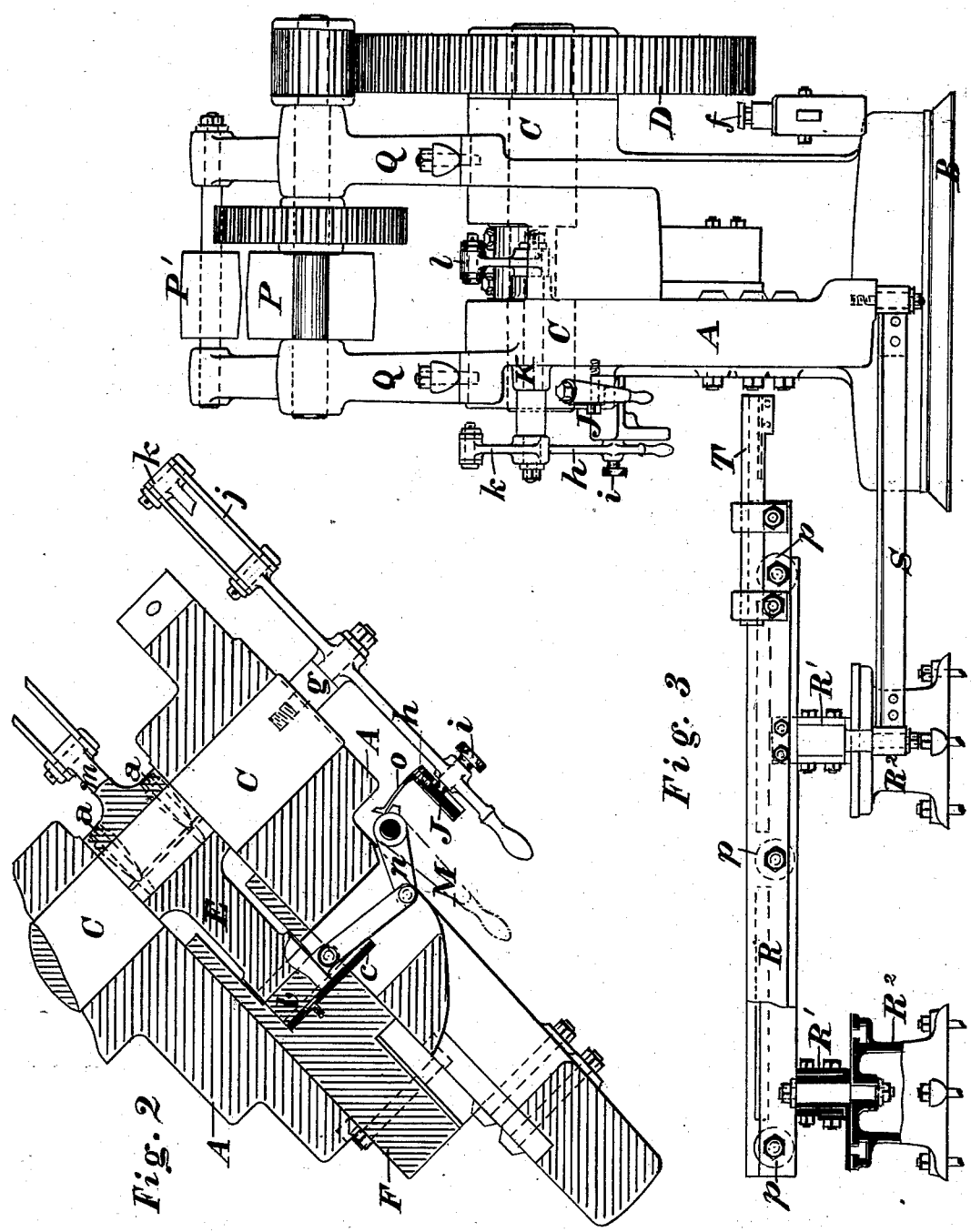

(Model.)
W. & C. SELLERS.
Angle Shears.
No. 235,908. Patented Dec. 28, 1880.
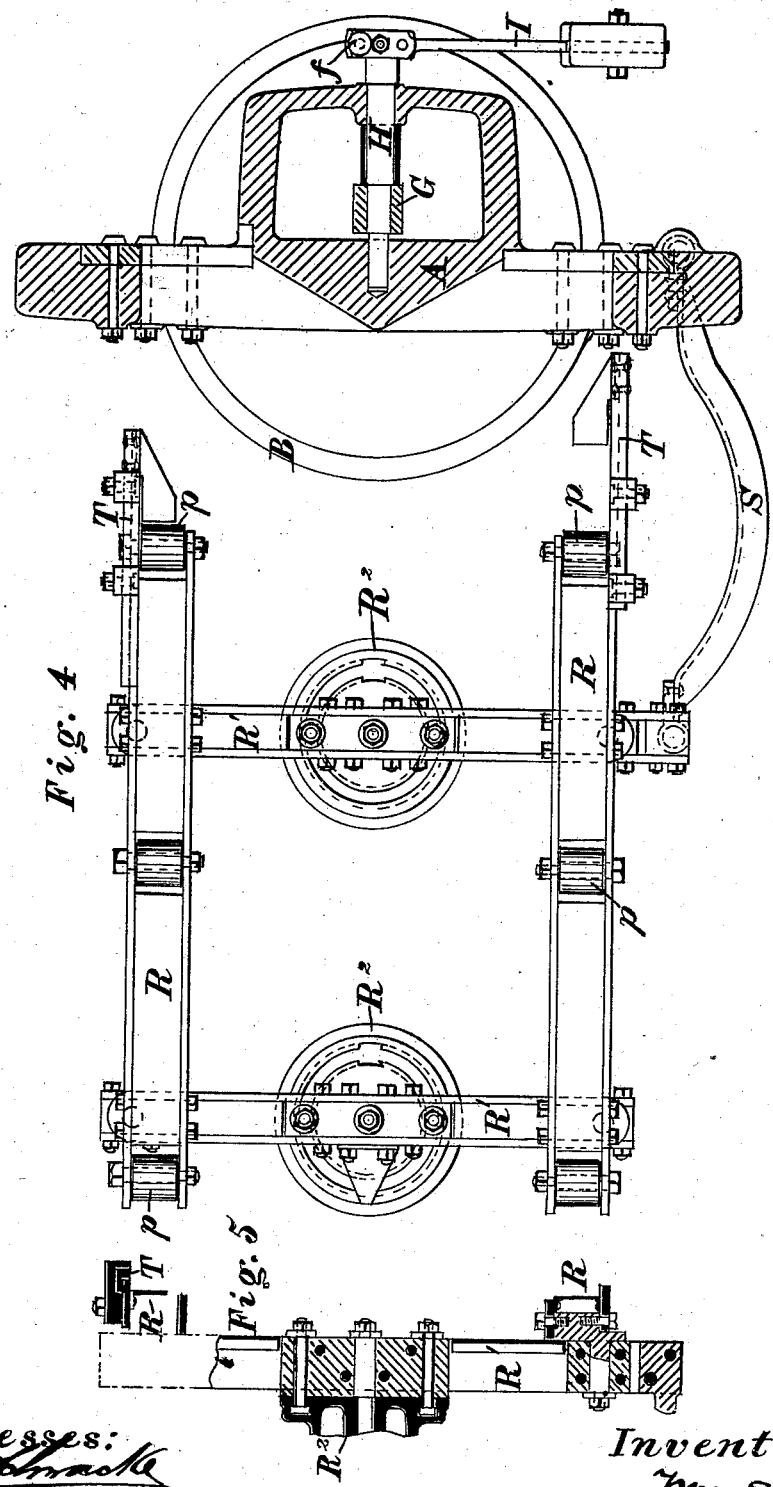

UNITED STATES PATENT OFFICE.

WILLIAM SELLERS AND COLEMAN SELLERS, OF PHILADELPHIA, PENNSYLVANIA; SAID COLEMAN SELLERS ASSIGNOR TO JOHN SELLERS, JR., OF SAME PLACE.

ANGLE-SHEARS.

SPECIFICATION forming part of Letters Patent No. 235,908, dated December 28, 1880.

Application filed July 19, 1880. (Model.)

*To all whom it may concern:*

Be it known that we, WILLIAM SELLERS and COLEMAN SELLERS, citizens of the United States, residing at the city of Philadelphia, in the State of Pennsylvania, have jointly invented certain new and useful Improvements in Angle-Shears, of which improvements the following is a specification.

Our invention relates to that class of shears for cutting angle-bars square or at any desired angle to the line of the bar, and either to the right or left, so that two bars may be united together at any desired angle to each other.

In shearing angles it is convenient to allow the angle to rest upon one of its "legs" or sides, and to this end it is necessary that the shear-blade shall travel in a plane inclined to the horizon, or at an angle of forty-five degrees. To cut the angle to the "right" or "left," as it is technically called, two shearing-blades, each inclined at an angle of forty-five degrees in opposite directions, are provided with suitable stationary blades to each, so that the planes of travel for the two shearing-blades shall stand at an angle of ninety degrees to each other; and to accomplish these purposes such duplex angle-shears have heretofore been constructed with a central eccentric-shaft operating through two eccentrics, two shearing-blades sliding in guides on each side of the central shaft, these guides being at an angle of ninety degrees to each other. To cut the angle-bar square it may be presented to either shear in a line perpendicular to the face of the shear-blade; but to cut to any other angle than square the bar must be presented to the proper blade, according as it is to be cut to the right or the left, and at the required angle, so that for such work it has heretofore been requisite to place the machine in the shop so that it will have a space in front and on either side of it sufficient to allow the longest angle-bars to be presented to the shear-blade at the proper angle. Such angle-bars are frequently forty to fifty feet long, and it is evident that not only a vast deal of shop-room must be occupied with such a machine, but a vast deal of labor must be expended in carrying the bars to the proper position to be sheared. In presenting such angle-bars at the proper angle to the shear-blade the center line, about which it should swing, is the vertical cutting-edge of the stationary blade, and heretofore no provision has been made for a guide adjustable about such center line. The bars have been cut to a scribe-line on the bar itself, or to a scribe-line temporarily laid out upon some convenient surface extraneous to the machine, or to a stop similarly arranged outside of the machine. The power required to cut such angle-bars is very great, and the sliding surfaces through which this power must be transmitted must therefore be correspondingly large, and where a separate eccentric for each shear-blade is used upon one shaft the space required upon the shaft is necessarily double that required for one, and the size of the shaft must be increased as the distance between its supports on each side of these eccentrics is increased. In cutting bars on such shears at any angle other than a right angle, but one shear-blade can be used at a time. As heretofore constructed, both must be in motion, neither can be stopped without stopping the whole machine, and neither has been counterbalanced, so that the lost motion, which is almost inseparable from the use of such a machine, will all be taken up in one direction when the blade strikes the work, and the shock of the final cutting and parting of the bar will be intensified by the shock from the arrest of this lost motion in the opposite direction.

It is the object of our invention to cut angle-bars at any desired angle, and at the same time to avoid inclining them to their line of travel through the workshop, so as thereby to save room as well as the expenditure of labor in handling the bars unnecessarily.

It is a further object of our invention, while maintaining the angle-bars in their line of traverse through the shop, or parallel thereto, to present them to the shear-blades at the proper angle to be cut without the necessity of scribing them or of working to scribe-lines.

It is a further object of our invention to operate both shear-blades from one eccentric, so as thereby to diminish the length and the diameter of the eccentric-shaft heretofore required.

It is a further object of our invention to provide a stop-motion to each shear-blade, so that either or both may be stopped while all of the driving machinery remains in operation, so that when the work is adjusted for cutting, the cut itself may be made without the loss of time required to put the driving machinery in operation or the loss of power which would result from the absence of its momentum.

It is a further object of our invention to utilize the weight of each shear-blade and the sliding head to which it is attached, so as to balance the other.

It is a further object of our invention to provide a counter-weight to the operating shear-blade to take up all lost motion, and to hold this blade at the top of its stroke when thrown out of gear with its driving machinery.

To these ends our invention consists in providing a shearing-machine capable of revolving or vibrating about a vertical axis, so that the required angular cut upon the bar may be obtained by inclining the face of the machine itself to the line in which the bar is to be moved.

It further consists in providing a belt-driving apparatus which shall transmit the power required to operate the machine from any convenient line of shafting to the machine without being affected by the vibrations of the machine about its vertical axis within the limits required to produce the required angular cut.

It further consists in providing a parallel-motion guide so connected to the shearing-machine that at whatever angle the machine may be set to cut, the bar to be cut, when pressed against this guide, will strike the vertical side of the fixed shear-blade, which operates upon it, and be presented to this blade at the angle to which the machine is set.

It further consists in providing a single swinging eccentric to operate the shear-blades, and in so guiding and locking it in any desired position that it will operate either shear-blade, or it can be locked midway between them, so that both may remain at rest while the eccentric is in motion.

It further consists in combining with such swinging eccentric a sliding concave bearing-block in each shear-blade head, so that when the eccentric is locked in position to operate the shear-blade head no movement of this head can take place until the sliding block is put into gear with the eccentric.

It further consists in supporting each shear-blade head upon the opposite ends of a balance-beam which is secured at its center on a shaft that can vibrate freely in its journals, so that the weight of one head shall balance that of the other.

It further consists in attaching a weighted lever to the outer end of the shaft which carries the balance-beam, so that when the weight is upon one side of the shaft the shear-blade head upon the opposite side of the shaft will be counterweighted upward, and reversing the position of the weight as to the shaft will counterweight the other head upward.

We attain these objects by the mechanism illustrated in the accompanying drawings, in which—

Figure 1 is a vertical front elevation of the shearing-machine and its driving apparatus. Fig. 2 is a cross-section through the center of the eccentric which operates the shear-blade heads and through the center of one of these heads. Fig. 3 is a side elevation of the shearing-machine and its parallel-motion guides. Fig. 4 is a horizontal cross-section of the shearing-machine at the level of the parallel-motion guides and a plan of these guides. Fig. 5 is an end elevation and partly sectional view of the parallel-motion guides.

Similar letters refer to similar parts throughout the several views.

The main portion A of the machine consists of a heavy cast-iron frame, the base of which is circular and rests upon a circular base-plate, B, and between A and B we provide anti-friction rollers running in grooves, so as to permit the frame A to rotate or vibrate freely about its axis, which is perpendicular to the base-plate B, while they afford it a firm support. The lower edge of the frame A should be laid off or divided into degrees up to sixty degrees in either direction from any given point on its circumference, and a heavy scribe-mark placed upon the beveled side of the base-plate B, these degrees and mark (not shown in the drawings) being of a size to be easily read by the workman and located upon the circumference to suit his convenience, so that by these he may adjust the machine to whatever angle it is desired the bars shall be cut.

At the upper end of the frame A, and at right angles to its axis, we provide an eccentric-shaft, C, which projects beyond the frame A, so as to receive the spur-wheel D, by which it is driven, and about midway between this wheel and the other end of the shaft a portion is turned out, so as to be eccentric to the remainder. Thus the shaft is permitted to slide into its journals from the end next the wheel, so that this wheel may be secured upon the shaft, and shaft and wheel be placed in or taken out of the frame A without removing the wheel from the shaft. This shaft is retained in place in the frame A by the eccentric E, which clamps the eccentric portion of the shaft and fills the space between the journals in which the shaft revolves, the eccentric being divided in two parts, parallel with the axis of the shaft, which are secured together by the screw-bolts $a\ a$, all of which is shown clearly in Fig. 2.

On either side of the shaft C, and at right angles to each other, we provide two shear-blade heads, F and F', which slide freely in guides within the frame A, perpendicular to the axis of the shaft C, each guide being at an angle of forty-five degrees to the axis of the frame A.

The lower half of the eccentric E is provided with an arm the end of which is cylindrical and plays freely in the socket-piece b within the shear-blade head, and the thickness of this socket-piece must be in excess of the stroke of the eccentric. This socket-piece b rests upon a flanged plate, c, in the shear-blade head, and the plate c projects beyond the head, so as to form a table which shall support the socket-piece when it is withdrawn laterally outside of the eccentric-arm, and to permit this a rectangular hole through the frame A is provided.

The shear-heads F and F' are supported by the lugs d and d' upon the ends of the balance-beam G. (Shown in dotted lines, Fig. 1, and in section through its central support in Fig. 4.)

The balance-beam G is keyed securely upon the shaft H, Fig. 4, which projects through the back of the frame A, and upon its outer end we pivot the weighted lever I, so that it can make a half-revolution in a plane parallel to the axis of the shaft H, and so that it can be secured at either extremity of its movement by the pin f, Fig. 4, and shown also in dotted lines in Fig. 1. When the weighted lever I is in the position represented by the drawings it will tend to force the shear-blade F against the end of the eccentric-arm; but if the lever I is turned upon the opposite side of the shaft H it will then tend to force the shear-blade head F' toward the eccentric.

In the end of the shaft C opposite the wheel D, and in the axis of the eccentric portion of this shaft, we provide a stud, g, which carries the swinging lever h, the lower end of which is provided with a conveniently-shaped handle, above which is a screw-pin, i. From the center of pin i to the center of the stud g is the same distance as from the center of the eccentric E to the center of the cylindrical end of the arm on its lower half. The pin i is so arranged that when screwed home its end will project through the lever upon its opposite side and into a slot in the curved plate J, which will prevent the lever h from turning with the motion of the shaft C, but will permit it to play freely with the eccentricity of the stud g, which supports it. Upon the opposite side of this stud, and at the upper end of the lever h, we provide a link, j, which is attached at one end to the lever h, and at the other to an arm, k, upon the end of a shaft passing through a bearing, K, arranged in frame A, to support it and permit it to turn freely. Upon the opposite end of this shaft we provide an arm, l, of the same length as the arm k, and the end of the arm l is connected by a link to an arm, m, upon the upper half of the eccentric E, the point of attachment of the link to the arm m being at the same distance from the center of the eccentric as that of the link j from the center of the stud g. With this arrangement the cylindrical end of the arm on the lower half of the eccentric E will move in the direction of the slot in the curved plate J.

We provide the curved plate J with three slots, all radiating from the center of the shaft C. Two of these slots are at an angle of forty-five degrees to the axis of the frame A, and consequently are in the same plane as the guides for the shear-blade heads F and F', and one is midway between the first two and in the same plane as the axis of the frame A, so that when the swinging lever h is in the position shown by the drawings the eccentric E will be locked in gear with the shear-blade head F, and if this lever is swung over to the opposite slot the eccentric will then be locked in gear with the shear-blade head F'; but if the lever is moved to the middle slot the eccentric will be locked out of gear from both heads.

The two ends of the curved plate J are arranged to carry two shafts, which turn freely in their bearings, and which, upon their outer ends, are provided with handles M and N. Upon the opposite end of the shaft which carries the handle M we provide an arm, n, which is attached by links to the socket-piece b, and upon the hub of the arm n is a lug so arranged that a spring, o, one end of which is secured to the curved plate J, will hold the arm at either extremity of its movement. When the handle M is in the position indicated by the drawings the socket-piece b will fill the space between the cylindrical end of the eccentric-arm and the end of the shear-blade head F, so that this head will follow the rectilinear movement of the eccentric-arm; but if the handle M is pulled outward from the frame A the socket-piece b will be withdrawn and the head F will be raised by the weighted lever to the upper end of the stroke, and until the balance-beam G is arrested by contact with the frame A; but the head will then be out of reach of the eccentric-arm, and will remain at rest although the eccentric-arm may be in motion. A similar attachment is provided to the handle N, so that to whichever shear-blade head the eccentric-arm is geared the motion of that head may be arrested without affecting the motion of the eccentric.

The shear-blades are attached to the heads F and F' and to the frame A by bolts, as shown in the drawings, Figs. 1, 2, and 3.

Motion is communicated to the wheel D from the fly-wheel pulley P by means of the two pinions and gear-wheel, (shown clearly in the drawings, Figs. 1 and 3,) and this gearing is supported in journals upon the two frames Q Q, mounted upon the top of the frame A. The position of the fly-wheel pulley P with reference to the axis of the frame A must be such that the driving-belt, both in going toward and from the machine, will be parallel to this axis and as close as practicable thereto. To accomplish this we provide the carrying-pulley P', preferably upon the slack or going-off side of the belt, as we thereby diminish the strain upon its journals, and above these pulleys we provide the driving-pulley P² and carrying-pulley P³ mounted upon shafts which revolve in journals fixed to the building, the length of the shaft in the driving-pulley P² being such as to carry it within convenient distance of the power which is to operate it. With this arrangement of driving and carrying pulleys the frame A may be vibrated about its axis within the range required, carrying with it the pulleys P and P', without affecting the operation of the driving-belt.

To guide the bar to the machine at the proper angle to be cut we provide the two guide-bars R R, mounted upon the cross-bars R' R', which, in turn, are mounted upon the pedestals R² R², the points of attachment in all cases being journals or pivots, so that the cross-bars R' R' may vibrate about the axis of the pedestals R² R², and the guide-bars may vibrate about their axes in the ends of the cross-bars R' R', the whole forming a parallel motion. The outer end of the cross-bar next the machine is attached to the machine by pin-joints through the link S, the joint on the machine being in the plane of the vertical face of the shear-blades on the frame A and parallel to the vertical edge thereof, and the joint on the cross-bar being in the plane of the axis of the guide-bars and the same distance from the axis of the pedestal that the pin-joint on the machine is from the axis of the frame A.

The guide-bars R R are each composed of two bars parallel to each other, and between which we interpose rollers $p\ p$, to facilitate the movement of the bars to be cut, which rest upon and are supported by these rollers. The outer bars, composing the guide-bars R R, are raised above the surface of the rollers $p\ p$, to form guides against which the angles are pressed laterally, and are constructed so that the distance from one bar to the other will be the same as the distance from the vertical edge of one shear-blade on the frame A is from the other when the guide-bars are perpendicular to the plane of these shear-blades, as represented in the drawings. Consequently these outer bars will guide the angles, when in this position, to the vertical edge of the shear-blades, and in this position the angles would be cut square or at an angle of ninety degrees. It will be evident also that when the machine is adjusted to any other angle it will carry the guide-bars with it, and that in whatever position the machine may be set the guide-bars will always direct the angles to the vertical edge of whichever shear-blade on the frame A may be operating. On the ends of these guide-bars next the machine we provide sliding guide-bars T T, which serve to extend the main guide-bars closer to the machine for short work, and to bring the guides as close as possible to the machine at whatever angle it may be set.

In order to secure the machine in any position that it may be set we provide circular slots in the top of the pedestals R² R², in which the heads of bolts which pass through the cross-bars R' R' may revolve. By screwing up the nuts on the top of these bolts the cross-bars will be bolted securely upon the top of the pedestals, and the machine will be prevented from turning about its axis through the operation of the link S.

Having thus described our invention, what we claim as new, and desire to secure by Letters Patent, is—

1. A shearing-machine vibrating about a vertical axis, substantially as and for the purposes set forth.

2. In a shearing-machine vibrating about a vertical axis, two pulleys the axes of which vibrate with the machine, two the axes of which are fixed above the machine, and an endless belt, substantially as and for the purposes set forth.

3. In combination with a shearing-machine vibrating about a vertical axis, a guide-bar vibrating about two vertical axes, substantially as and for the purposes set forth.

4. In combination with two shear-blade heads, a swinging eccentric which operates either at will, substantially as described.

5. In combination, two shear-blade heads, a swinging eccentric, and a swinging and locking lever, substantially as and for the purposes set forth.

6. In combination, two shear-blade heads, a swinging eccentric, a swinging and locking lever, and a sliding concave bearing-block, substantially as described.

7. In combination, two shear-blade heads and a balance-beam, substantially as and for the purposes set forth.

8. In combination, two shear-blade heads, a balance-beam, and a counter-weight, substantially as and for the purposes set forth.

WM. SELLERS.
COLEMAN SELLERS.

Witnesses:
JAS. H. SCHWACK,
JAS. C. BROOKS.